(12) United States Patent
Alhalabi et al.

(10) Patent No.: US 11,132,855 B2
(45) Date of Patent: Sep. 28, 2021

(54) PATTERN RECOGNITION LOCKING SYSTEM AND METHOD OF OPERATION

(71) Applicants: Bassem Alhalabi, Boca Raton, FL (US); Bilal Karakira, Miami, FL (US)

(72) Inventors: Bassem Alhalabi, Boca Raton, FL (US); Bilal Karakira, Miami, FL (US)

( * ) Notice: Subject to any disclaimer, the term of this patent is extended or adjusted under 35 U.S.C. 154(b) by 343 days.

(21) Appl. No.: 16/383,640

(22) Filed: Apr. 14, 2019

(65) Prior Publication Data

US 2020/0327756 A1    Oct. 15, 2020

(51) Int. Cl.
*G07C 9/00* (2020.01)
*G06K 9/62* (2006.01)
*G06K 9/68* (2006.01)
*G07C 9/24* (2020.01)

(52) U.S. Cl.
CPC ....... *G07C 9/00714* (2013.01); *G06K 9/6227* (2013.01); *G06K 9/6256* (2013.01); *G06K 9/6878* (2013.01); *G07C 9/247* (2020.01); *G07C 2009/00634* (2013.01); *G07C 2009/00746* (2013.01)

(58) Field of Classification Search
CPC .. G07C 9/00714; G07C 9/247; G06K 9/6227; G06K 9/6256; G06K 9/6878
USPC ......................................................... 70/277
See application file for complete search history.

(56) References Cited

U.S. PATENT DOCUMENTS

| | | | | |
|---|---|---|---|---|
| 9,495,820 | B1* | 11/2016 | Li | E05B 37/0068 |
| 10,284,552 | B1* | 5/2019 | Wurmfeld | H04L 63/107 |
| 2013/0335222 | A1* | 12/2013 | Comerford | E05B 65/00 340/542 |
| 2015/0042454 | A1* | 2/2015 | Lee | G07C 9/00182 340/5.72 |
| 2015/0161374 | A1* | 6/2015 | Kim | G06F 3/017 726/19 |
| 2016/0055323 | A1* | 2/2016 | Stuntebeck | G01P 15/0802 726/17 |
| 2017/0109952 | A1* | 4/2017 | Johnson | G07C 9/00309 |
| 2020/0219338 | A1* | 7/2020 | Chen | G07C 9/0069 |

* cited by examiner

*Primary Examiner* — Kerri L Mcnally

(57) ABSTRACT

A pattern recognition locking system and method is operable to lock and unlock an object through a sequence of knocks, rotations, and ambient vibrations that are measured by an accelerometer as acceleration, and a gyroscope as orientation. The sequence and intensity of vibrations and intensity are processed by a microcontroller that utilizes a pattern recognition algorithm to: recognize the intensity and sequence of acceleration and orientation; identify the most intense motion from the degrees of freedom; and, after identifying a sequence of the most intense motions for respective degree of freedom, the microcontroller transmits a signal to lock mechanism to lock or unlock an object if sequence of degrees of motion match a stored passcode. A sleep module powers off the system when no motion or vibrations detected. A new sequence of ambient vibrations and motion are created through a learning module. A reset switch reprograms the sequence of motions.

20 Claims, 3 Drawing Sheets

PATTERN RECOGNITION LOCKING SYSTEM AND METHOD OF OPERATION

FIELD OF THE INVENTION

The present invention relates generally to a pattern recognition locking system and method. More so, a locking system and method is operable to lock and unlock an object with a lock mechanism through a sequence of ambient vibrations and motions measured by an accelerometer as degrees of freedom of linear acceleration of the lock mechanism, and a gyroscope as degrees of freedom of the orientation of the lock mechanism; whereby the sequence of vibrations and motions are processed by a microcontroller that utilizes a pattern recognition algorithm to recognize the intensity and sequence of vibrations and motions, identify the most intense motion from the degrees of freedom, and, after identifying a sequence of the most intense motions in the respective degree of freedom, the microcontroller transmits a signal to the lock mechanism to lock or unlock an object if the sequence of degrees of motion match a stored passcode; whereby a sleep module powers off the system when no ambient motion or vibrations are detected; and whereby a new sequence of ambient vibrations and motion are created through a learning module.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a lock is a mechanical or electronic fastening device that secures an object into a fixed position. The lock is released by a physical object, such as a key, keycard, fingerprint, RFID card, security token, coin etc., by entering a fitted key or supplying secret information. Often, the key or passcode is forgotten. There is no sequence of movements that can be used to lock or unlock the locking device.

Other proposals have involved locking devices. The problem with these locking devices is that they do not allow the fastener/bolt to lock and unlock by applying a sequence of vibrations and motions directly to the box, so as to measure multiple degrees of freedom with an accelerometer and gyroscope. Also, the prior art does not use algorithms to calculate the degrees of freedom for the vibrations and motions, and use the resultant to signal for the locking device to be locked or unlocked. Even though the above cited gripping devices meets some of the needs of the market, a pattern recognition locking system and method to lock and unlock an object through a sequence of ambient vibrations and motions measured by an accelerometer and gyroscope; whereby the sequence of vibrations and motions are processed by a microcontroller that utilizes a pattern recognition algorithm to recognize the sequence of vibrations and motions; whereby the pattern recognition algorithm determines the degrees of freedom, matches the degrees of freedom to a correlating number, and calculates a resultant; whereby if the number matches a stored passcode, the microcontroller transmits a signal to the lock mechanism to lock or unlock an object; and whereby a new sequence of ambient vibrations and motion are created through a learning module, is still desired.

SUMMARY OF THE INVENTION

The present invention is directed to a pattern recognition locking system and method. The system and method is configured to lock and unlock an object through a sequence of secret knocks, shakes, rotations, and other ambient vibrations and motions that can be measured by an accelerometer as degrees of freedom of acceleration of the lock mechanism, and a gyroscope as degrees of freedom of orientation of the lock mechanism. The sequence of ambient vibrations and motions are processed by a microcontroller that utilizes a pattern recognition algorithm to recognize the intensity and sequence of vibrations and motions. The microcontroller identifies the most intense motion from the degrees of freedom. After identifying a sequence of the most intense motions in the respective degree of freedom, the microcontroller transmits a signal to the lock mechanism to lock or unlock an object if the sequence of degrees of motion match a stored passcode. A new sequence of ambient vibrations and motion can be created through a learning module in which a new pattern of ambient vibrations and motion is applied to the lock mechanism.

The pattern recognition locking system and method provides a lock mechanism that receives a sequence of ambient vibrations and motion, which may include knocking, tapping, or other forceful impacts. The lock mechanism contains a gyroscope and an accelerometer that measure the most intense vibrations and angular velocity of the ambient vibrations and motion between up to six degrees of freedom. In one embodiment, the gyroscope identifies at least three degrees of freedom of the ambient orientations (GX, GY, GZ), and the accelerometer identifies at least three degrees of freedom of the ambient accelerations (AX, AY, AZ).

The accelerometer measures linear acceleration. The gyroscope measures angular orientation. Each has three degrees of freedom X, Y, and Z. The acceleration and orientation are results of the motion due to the movement of the sensors attached to body of the lock by knocking or tabbing.

Each degree of freedom correlates to a number that potentially matches a stored passcode. The pattern of degrees of freedom are processed by a microcontroller having a pattern recognition algorithm. The microcontroller identifies the most intense acceleration and orientation, as measured by the gyroscope and the accelerometer. The pattern recognition algorithm compares the degrees of freedom to determine the most intense acceleration and orientation.

The pattern recognition algorithm performs a calculation to match a degree of freedom for the most intense acceleration and orientation with a number. The pattern recognition algorithm correlates a sequence of the numbers with a stored passcode. If the sequence of numbers matches the stored passcode, the microcontroller locks or unlocks the lock mechanism.

Further, after an initial reset or power-up, the system enters a continuous short loop of low-power sleep mode through use of a sleep module to save energy when substantially no movement or vibration are measured. However, once a movement or vibration is detected the microcontroller wakes up and starts processing. Further, the sequence of ambient vibrations and motion applied to the lock mechanism can be changed through a learning module in which a new pattern of ambient vibrations and motion is entered into the learning module and applied for subsequent locking and unlocking operations.

In one aspect, a pattern recognition locking system, comprises:
- a lock mechanism comprising at least one surface and a fastener, the surface receiving a sequence of ambient vibrations and motion, the fastener operable to lock and unlock an object;
- an accelerometer operatively connected to the surface of the lock mechanism, the accelerometer measuring at least three degrees of freedom of acceleration generated by the ambient vibrations and motion of the lock mechanism;
- a gyroscope operatively connected to the surface of the lock mechanism, the gyroscope measuring at least three degrees of freedom of the orientation from the ambient vibrations and motion of the lock mechanism, each degree of freedom correlating to a number;
- a microcontroller operatively connected to the fastener of the lock mechanism, the microcontroller defined by a pattern recognition algorithm,
- the microcontroller identifying the most intense acceleration and orientation, as measured by the gyroscope and the accelerometer, the microcontroller identifying the most intense degrees of freedom for the acceleration and orientation,
- the pattern recognition algorithm matching the most intense degree of freedom for the acceleration and orientation with numbers, the pattern recognition algorithm correlating the numbers with a stored passcode, whereby if the numbers match the stored passcode, the microcontroller transmits a signal to the fastener to lock or unlock the object; and
- a learning module operable to register, with the microcontroller, a subsequent three degrees of freedom of acceleration, and a subsequent three degrees of freedom of the orientation,
- whereby the microcontroller transmits a signal to the fastener to lock or unlock the object based on the calculations of the subsequent degrees of freedom.

In another aspect, the lock mechanism includes at least one of the following: a container, a jewelry box, a safe, a house door, a vehicle ignition, a padlock locking device, a bolt locking device, a magnetic locking device, and a household or commercial items operable to lock and unlock.

In another aspect, the at least three degrees of freedom of acceleration to measure vibrations are defined by AX, AY, and AZ.

In another aspect, the at least three degrees of freedom of the angular velocity to measure orientation are defined by GX, GY, and GZ.

In another aspect, the system further comprises a power source.

In another aspect, the system further comprises a reset switch, the reset switch operable to enable registration of the subsequent three degrees of freedom of vibrations, and the subsequent three degrees of freedom of the angular velocity.

In another aspect, the system further comprises a lock and unlock relay defined by two activation states.

In another aspect, the system further comprises three interface wires.

In another aspect, the interface wires comprise a common wire, a closed dry switch, and an open dry switch.

In another aspect, the vibrations received by the surface of the lock mechanism comprises a back-and-forth motion.

In another aspect, the three degrees of freedom of acceleration measured by the accelerometer include shaking motions.

In another aspect, the three degrees of freedom of the orientation measured by the gyroscope include rotational motions.

It is one objective of the present invention to lock and unlock an object through a sequence of secret knocks, shakes, rotations, and other ambient vibrations and motions that can be measured by an accelerometer and gyroscope.

It is another objective to provide a lock mechanism that has the ability to recognize its ambient vibration in at least six degrees of freedom.

It is another objective to provide a pattern recognition algorithm that is operable to decipher the sequence of ambient vibrations and motions applied to the lock mechanism.

It is another objective to retrain the lock mechanism with a new series of ambient vibrations and motions for unlocking.

Yet another objective is to provide a locking/unlocking mechanism which could be incorporated in various applications, such as a jewelry box, safe, house door, or any household or commercial items that needs to be locked and unlocked.

Yet another objective is to provide an inexpensive to manufacture pattern recognition locking system.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
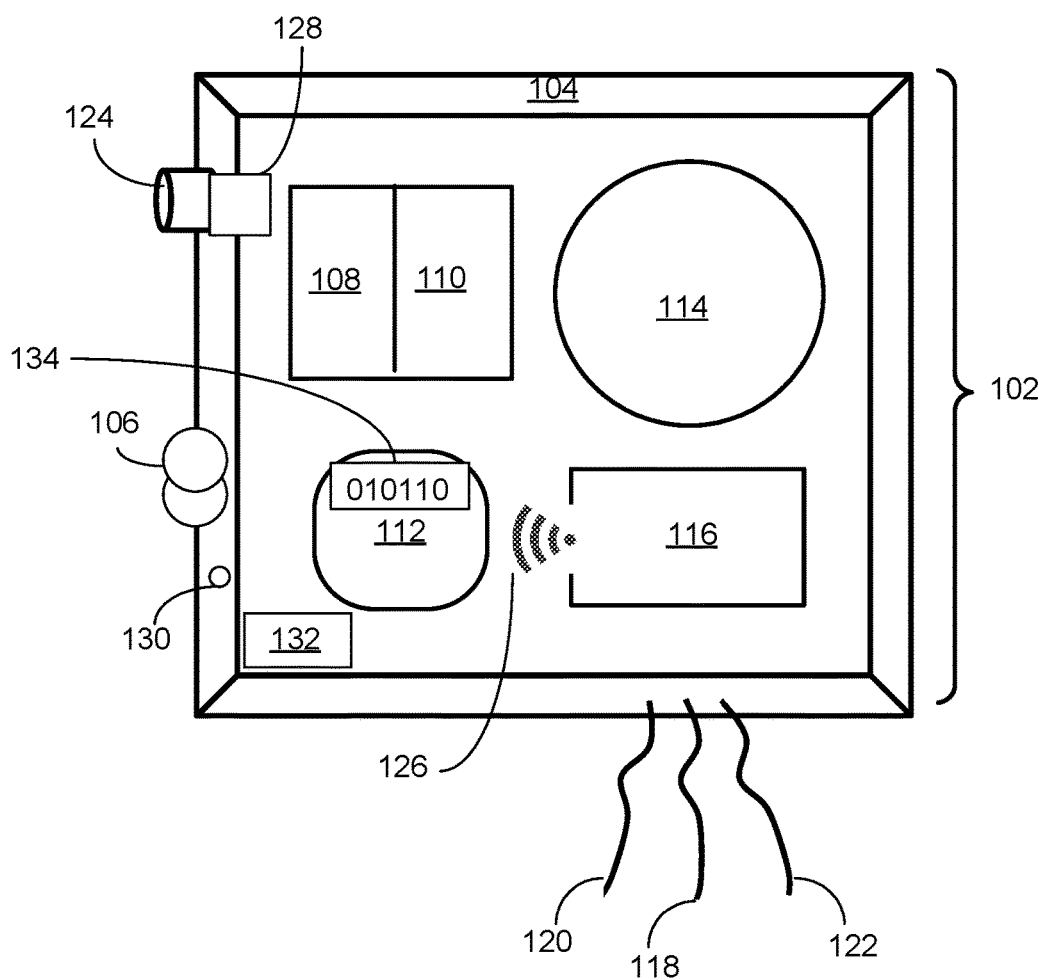
FIG. 1 illustrates a perspective of an exemplary pattern recognition locking system, showing the components of the lock mechanism, in accordance with an embodiment of the present invention.
Figure 2:
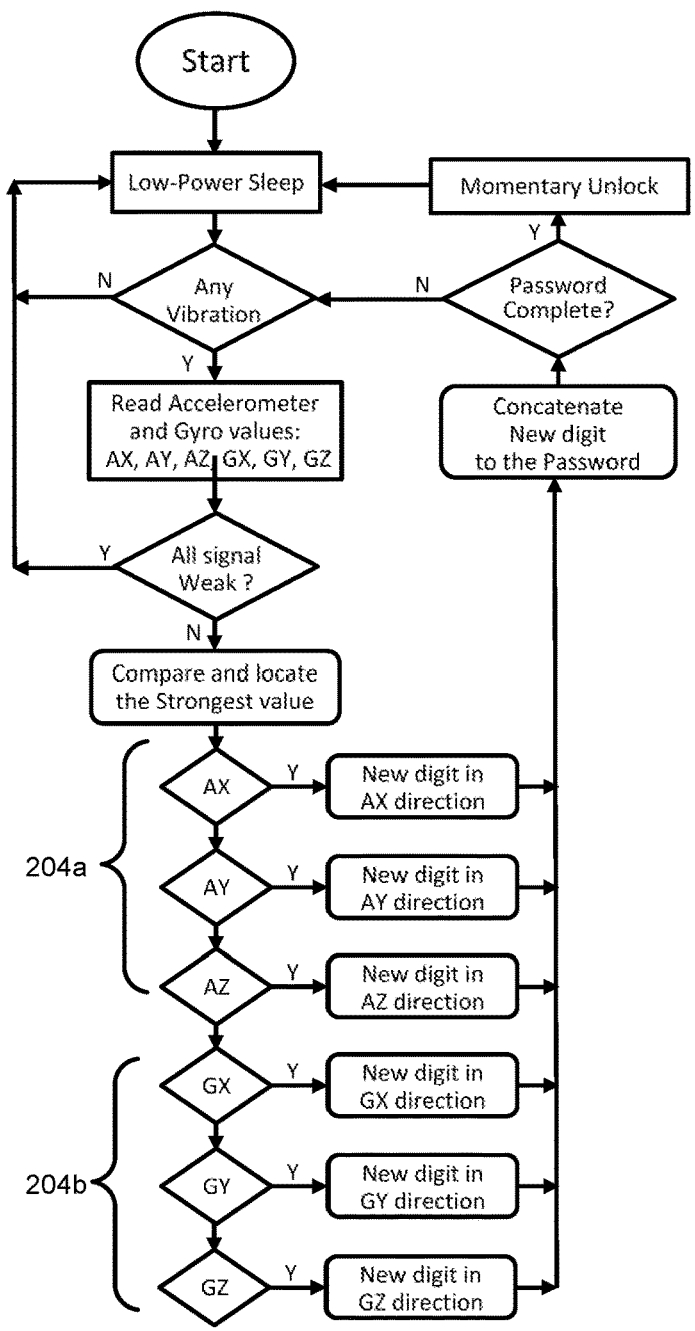
FIG. 2 illustrates a flowchart referencing the process for the pattern recognition algorithm to calculate the degrees of freedom and correlating combination of numbers to determine whether to lock or unlock the lock mechanism, in accordance with an embodiment of the present invention.
Figure 3:
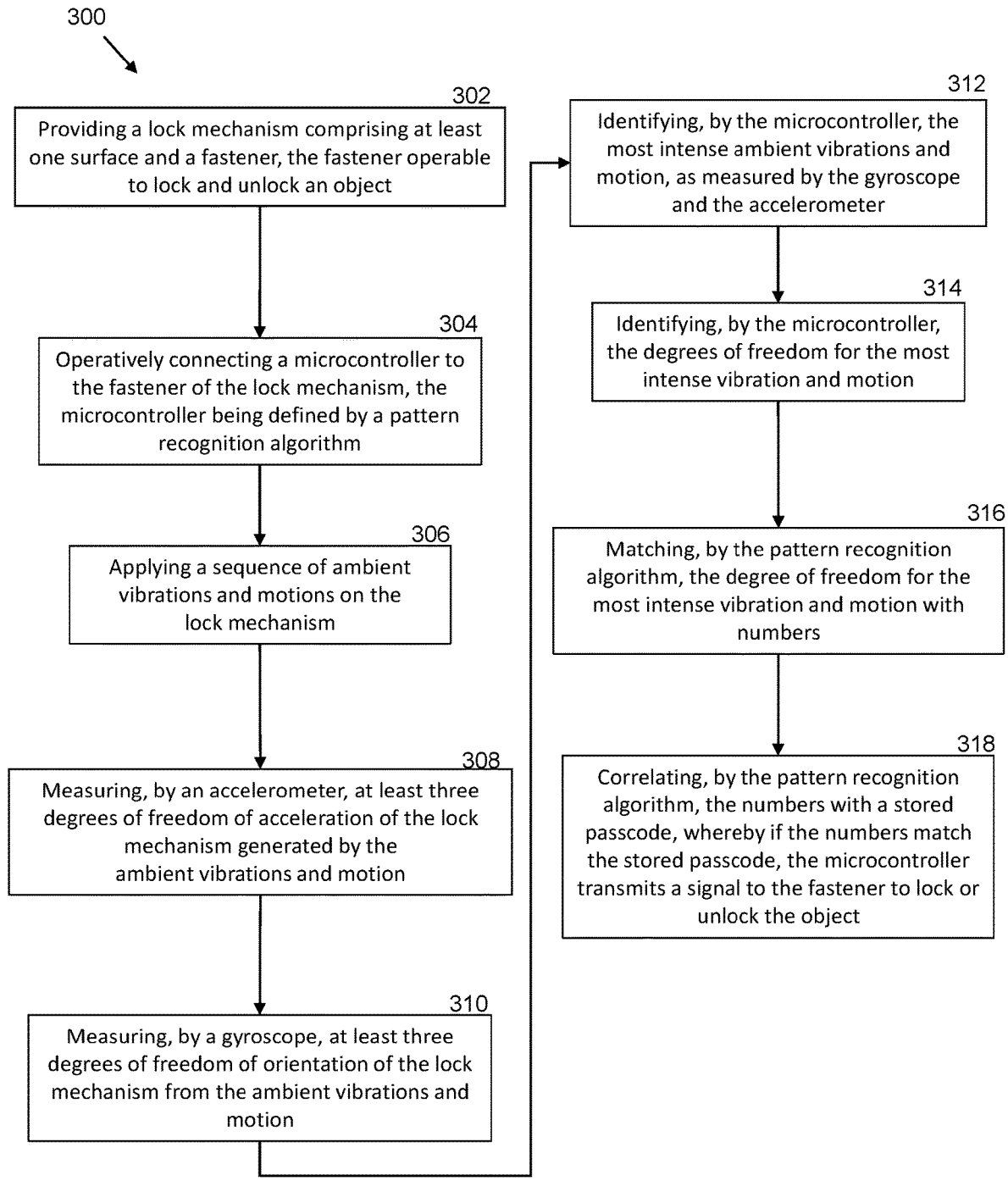
FIG. 3 illustrates a flowchart of an exemplary pattern recognition locking method, in accordance with an embodiment of the present invention.

FIGS. 1-3 illustrate a pattern recognition locking system 100 and method 300. The pattern recognition locking system 100, hereafter "system 100" provides a lock mechanism that is configured to lock and unlock an object through a sequence of secret knocks, shakes, rotations, and other ambient vibrations and motions that can be measured by an accelerometer 108 that measures acceleration based on the motions, and a gyroscope 110 that measures orientation based on the motions and/or vibrations applied to the lock mechanism.

The degrees of freedom 204a, 204b for the acceleration and orientation are calculated by a microcontroller 112 having a pattern recognition algorithm 200. The pattern recognition algorithm 200 calculates the intensity of the degrees of freedom 204a, 204b and matches the strongest, or most intense, degree of freedom motion to a correlating number. The most intense being defined as the strongest linear acceleration and/or angular orientation measured by the accelerometer and gyroscope.

If the numbers match a stored passcode 134, the microcontroller 112 transmits a signal 326 to the lock mechanism 102 to lock or unlock an object if the sequence matches a preprogrammed sequence. Further, a new sequence of ambient vibrations and motions to be applied to the lock mechanism can be created through a learning module 128 in which a new pattern of ambient vibrations and motion is applied to the lock mechanism 102.

As FIG. 1 references, the system 100 provides a lock mechanism 102, which may include a mechanical or electronic fastening device that is selectively locked and unlocked by applying a sequential pattern of ambient vibrations and motions directly to the lock mechanism 102. The lock mechanism 102 comprises measuring components that recognize ambient vibrations, angular velocity, rotations, and/or motion in at least six degrees of freedom 204a, 204b. The lock mechanism 102 may include, without limitation, a container, a jewelry box, a safe, a house door, a vehicle ignition, a padlock locking device, a bolt locking device, a magnetic locking device, and a household or commercial item that is operable to lock and unlock.

In some embodiments, the lock mechanism 102 comprises at least one surface 104 that forms around a volume and provides a contact point for applying various forces thereon. The surface 104 may be planar and include six orthogonal surfaces if the lock mechanism 102 is configured as a box. However, myriad shapes and dimensions may be fabricated with the lock mechanism 102, such that any number of surfaces are possible. The surface 104 is configured to receive a sequence of ambient vibrations and motion, such as a knock, a tap, a shake, a rotation, and other motions. It is these applied forces that are recorded and processed to determine if the lock mechanism 102 can be locked or unlocked.

The lock mechanism 102 may further include a fastener 106 that serves to lock and release an object from the inside of the lock mechanism 102, or from another object. In some embodiments, the lock mechanism 102 is a padlock, a bolt, a pin, a gear, and other mechanical fastening means known in the art. The fastener 106 may also have an electrical component, such as a receiver, therein to receive the signal 126 that commands a locking or unlocking function to occur. In one non-limiting embodiment, a light emitting diode (LED) indicator is operatively connected to the fastener 106. The LED indicator 130 indicates when the fastener 106 is locked and/or unlocked. The LED indicator 130 may also indicate mechanical problems in the lock mechanism 102.

Looking again at FIG. 1, the lock mechanism 102 contains, and is in operational connectivity with an accelerometer 108. The accelerometer 108 measures linear acceleration, or rate of change of velocity, and intensity thereof, of the locking mechanism in its own instantaneous rest frame. The acceleration is a result of the motion due to the movement of the sensors attached to body of the lock by knocking, tapping, or other motions and vibrations. The linear acceleration has three degrees of freedom: X, Y, and Z.

Those skilled in the art will recognize that accelerometers are used to detect and monitor vibration in rotating machinery. In one embodiment, the accelerometer 108 is operatively connected to the surface 104 of the lock mechanism 102, such that the ambient vibrations and motions can be detected. This connectivity may be a wired or wireless connection to the surface 104.

The accelerometer 108, as operational in the lock mechanism 102, measures at least three degrees of freedom 204a, 204b of acceleration. The measured acceleration are those that are generated by the ambient vibrations and motion on the lock mechanism. Exemplary vibrations may include, without limitation, a shaking motion applied to the surface 104 of the lock mechanism 102; a knocking motion applied to the surface 104 of the lock mechanism 102; a tapping motion applied to the surface 104 of the lock mechanism 102; and any sequence of strokes that apply sufficient force to actuate the accelerometer 108. In one non-limiting embodiment, the three degrees of freedom 204a of the acceleration are defined as AX, AY, AZ.

In other embodiments, a gyroscope 110 is operational in the lock mechanism 102. The gyroscope 110 measures the orientation and/or the angular orientation, and the intensity thereof, of the locking mechanism. The angular orientation is the motion from the movement of the sensors attached to body of the lock by knocking, tapping, and other motions and vibrations. The angular orientation has three degrees of freedom: X, Y, and Z.

Those skilled in the art will recognize that gyroscopes measure angular orientation and angular velocity. In one embodiment, the gyroscope 110 is operatively connected to the surface 104 of the lock mechanism 102, such that the applied changes in angular orientation to the lock mechanism 102 can be detected. This connectivity may be a wired or wireless connection to the surface 104.

The gyroscope 110, as operational in the lock mechanism 102, measures at least three degrees of freedom 204a of angular orientation from the ambient vibrations and motion that are applied to the surface 104 of the lock mechanism 102. Exemplary angular orientations may include, without limitation, a rotating motion applied to the surface 104 of the lock mechanism 102; a shaking motion applied to the surface 104 of the lock mechanism 102; a back-and-forth motion applied to the surface 104 of the lock mechanism 102; and any sequence of rotational motions that apply sufficient force to actuate the gyroscope 110. In one non-limiting embodiment, the three degrees of freedom 204b of the angular orientation are defined as GX, GY, GZ, as applied to an XYZ axis.

Thus, the accelerometer 108 and the gyroscope 110 measure at least six degrees of freedom 204a, 204b of linear acceleration and angular orientation defined as AX, AY, AZ, GX, GY, GZ. These degrees of freedom 204a, 204b are processed with a microcontroller 112, as described below.

In some embodiments, the microcontroller 112 correlates the numbers to the measured acceleration and orientation. The microcontroller has integrated therein, a pattern recognition algorithm 200, such as that can match, identify, correlate, and calculate digits and time sequences. The microcontroller is also operatively connected to the accelerometer and gyroscope, so as to identify the measured acceleration and orientation. In some embodiments, the microcontroller 112 may include a chip or other processing device known in the art, including counters, timers, and a small computer on a single integrated circuit. However the system 100 may utilize any processing means known in the art to record the measured degrees of freedom.

As FIG. 1 illustrates, the microcontroller 112 operatively connects to the fastener of the lock mechanism. The microcontroller has a pattern recognition algorithm. The microcontroller identifies signals from the most intense ambient acceleration and orientation, as measured by the accelerometer and the gyroscope. The microcontroller further identifies the degrees of freedom for the most intense acceleration and orientation applied to the surface of the lock mechanism. For example, a partial forward rotation is differentiated from a knocking force applied to the surface of the lock mechanism. Also, the forward rotational motion is identified before a rearward rotational motion if the forward motion id stronger.

The pattern recognition algorithm matches the degree of freedom for the most intense acceleration and orientation with numbers. The numbers may include digits 0-9, or other identifying indicia that can be strung together to form a passcode 134. Also, the pattern recognition algorithm correlates the numbers with a stored passcode 134. The stored passcode may include a sequence of numbers stored on the microcontroller. However in other embodiments, the passcode may be stored on a cloud, remote database, or other data storage unit known in the art. In this manner, if the sequence of numbers match the stored passcode 134, the microcontroller 112 transmits a signal to the fastener to lock or unlock the object.

Thus, the microcontroller compares six signals from the accelerometer and gyroscope to identify the signal with the strongest intensity. For example, if the strongest signal is in AX direction, then the microcontroller recognizes it as a stroke in the AX direction. Same applies to all other directions AY, AZ, GX, GY, GZ. Every time the microcontroller identifies a stroke, it concatenates it to the password being built one stroke at a time.

In one embodiment, the microcontroller 112 assigns each degree of freedom a number, creating a combination of number that form a quantitative passcode 134 for locking and unlocking the lock mechanism 102. For example:

AX correlates to the number 1
AY correlates to the number 2
AZ correlates to the number 3
GX correlates to the number 4
GY correlates to the number 5
GZ correlates to the number 6

Thus, a stored passcode defined as: 6-2-2-3-5-4-4 correlates to the following degrees of freedom 204a, 204b: GZ-AY-AY-AZ-GY-GX. The required ambient vibrations and motions that are applied to the surface 104 of the lock mechanism 102 correlates to these specified degrees of freedom 204a-b.

Thus, if the degrees of freedom 204a-b are defined as thus: GZ=forward 45° rotation; AY=rapid left-right motion; AZ=diagonal motion; GY=rearward 45° rotation; and GX=360° rotation of the lock mechanism 102.

Each motion for the degree of freedom correlates to a number. By correlating a sequence of the degrees of freedom 204a-b to the combination of numbers, the force, motion, rotation, etc. that is applied to the surface 104 of the lock mechanism 102 is quantified, and can be recorded and reapplied.

In this example of passcode 6-2-2-3-5-4-4, the lock mechanism 102 is first rotated forward 45°; then rapidly moved in a left-right (shaking) motion; then rapidly moved again in a left-right (shaking) motion; then moved in a diagonal motion; then rotated rearward 45°; and finally rotated 360°. This sequence of ambient vibrations and motions is the pattern that would lock or unlock the lock mechanism 102.

FIG. 2 illustrates a flowchart referencing a process for the pattern recognition algorithm 200 to calculate the degrees of freedom 204a, 204b and correlating combination of numbers to determine whether to lock or unlock the lock mechanism 102. As shown, the microcontroller and the pattern recognition algorithm 200 are configured to identify the most intense motions and vibrations from the accelerometer and gyroscope to determine the most intense vibration and motion.

The most intense motion is defined as a signal generated by the accelerometer and gyroscope, such that the strongest signal equates to the dominant motion applied to the lock mechanism, i.e., intensity.

The pattern recognition algorithm 200 subsequently matches the degree of freedom for the most intense acceleration and angular orientation with numbers. Finally, the pattern recognition algorithm 200 correlates the numbers with a stored passcode If the acceleration in the AX degree of freedom is greater than AY and AZ, then AX is the selected degree of freedom. The correlating number for AX is then selected.

If the acceleration in the AY degree of freedom is greater than AX and AZ, then AY is the selected degree of freedom. The correlating number for AY is then selected.

If acceleration in the AZ degree of freedom is greater than AX and AY, then AZ is the selected degree of freedom. The correlating number for AZ is then selected.

If the orientation in the GX degree of freedom is greater than GY and AZ, then GX is the selected degree of freedom. The correlating number for GX is then selected.

If the orientation in the GY degree of freedom is greater than GX and GZ, then GY is the selected degree of freedom. The correlating number for GY is then selected.

If the orientation in the GZ degree of freedom is greater than GX and GY, then GZ is the selected degree of freedom. The correlating number for GZ is then selected.

The pattern recognition algorithm 200 also makes a decision. If the selected numbers match the preprogrammed passcode 134, i.e., the passcode is complete, then the microcontroller 112 transits a signal 126 to the fastener 106 to lock or unlock the object. Thus, based on the resultant of the calculation, for each degree of freedom, the microcontroller 112 determines whether to lock or unlock the lock mechanism 102. It is significant to note that random movements which do not make up a correct password will be ignored.

In use, the operator is not required to visualize or even know which degree of freedom corresponds to which number in a key pad. Nor does the user needs to know how many degrees of freedom 204a, 204b are being used. The operator needs only to remember the specific pattern of ambient vibrations and motions, random movements, etc. to apply to the lock mechanism 102. This is sufficient to lock and unlock the fastener 106 from the object.

In a unique embodiment of altering the sequence of ambient vibrations and motions, the system 100 allows the sequence of ambient vibrations and motion that are applied to the locking mechanism to be changed through a learning module 128 in which a new pattern of ambient vibrations and motion is applied to the lock mechanism 102 and recorded by the microcontroller 112. The learning module 128 is operable to register, with the microcontroller 112, a subsequent three degrees of freedom 204a of acceleration, and a subsequent three degrees of freedom 204b of the angular orientation. In this manner, the microcontroller 112 transmits a signal to the fastener 106 to lock or unlock the object based on the calculations of the subsequent degrees of freedom 204a, 204b.

For the learning module 128 to program a new passcode into the lock mechanism 102, the lock mechanism 102 is set into the learning mode, and the operator can enter the new passcode by applying a new set of ambient vibrations, motions, knocks, rotations, and the like. Once the operator stops applying these forces, the microcontroller 112 resets and remembers the new pattern just entered as a new passcode. To enter the learning module 128 of the lock mechanism 102, the lock mechanism 102 must be opened, and a reset switch 124 must be pressed. Then, the reset switch 124 is configured to flash red to accept the new passcode. In one possible embodiment, the new passcode is entered three identical times to be accepted by the microcontroller 112.

However, it is significant to note that the lock mechanism 102 may be shipped from the manufacturer with a generic passcode of 4 identical knocks in any given random direction. The operator may then change the combination with the learning module 128.

Looking back at FIG. 1, the system 100 utilizes numerous electrical components to operate the fastener 106, accelerometer 108, gyroscope 110, and microcontroller 112. The system 100 further comprises a power source 114. The power source 114 may include a battery, such as a replaceable disc battery known in the art to last for multiple years.

In one alternative embodiment, the system 100 provides a sleep module 132 that powers off at least one of: the accelerometer, the gyroscope, and the microcontroller, when substantially no ambient vibrations and motion are measured. After the initial reset or power-up, the sleep module 132 enters a continuous short loop of low-power sleep mode to save energy when no movement or vibration is detected or measured. However, once movement or vibration is detected the microcontroller 112 wakes up and starts processing, as described above. Once the passcode 134 is completed meaning it positively compares to the stored correct passcode, the microcontroller sends a signal to momentary unlock, and then it returns to a Sleep mode.

The system 100 may also include a reset switch 124. The reset switch 124 is operable to enable registration of the subsequent three degrees of freedom 204a of vibrations, and the subsequent three degrees of freedom 204b of the angular velocity. To enter the learning module 128 of the lock mechanism 102, the lock mechanism 102 must be opened, and the reset switch 124 must be pressed. Then, the reset switch 124 flashes red to accept the new passcode.

In yet other embodiments, the system 100 comprises a lock and unlock relay 116 that is defined by two activation states. Continuing with the electrical components, the system 100 further comprises three interface wires 118, 120, 122. The interface wires comprise a common wire 118, a closed dry switch 120, and an open dry switch 122. In other embodiments, various wires, resistors, amplifiers, and the like may also be integrated into the lock mechanism 102.

FIG. 3 illustrates a flowchart of an exemplary pattern recognition locking method 300. The method 300 may include an initial Step 302 of providing a lock mechanism 102 comprising at least one surface 104 and a fastener 106, the fastener 106 operable to lock and unlock an object.

A Step 304 includes operatively connecting a microcontroller to the fastener of the lock mechanism, the microcontroller being defined by a pattern recognition algorithm.

The method 300 may further comprise a Step 306 of applying a sequence of ambient vibrations and motions on the surface 104 of the lock mechanism 102. The ambient vibrations and motions may include, without limitation, various knocks, taps, shakes, rotations, and other tactile contact with the surface of the lock mechanism 102.

A Step 308 includes measuring, by an accelerometer, at least three degrees of freedom of acceleration of the lock mechanism generated by the ambient vibrations and motion.

In some embodiments, a Step 310 comprises measuring, by a gyroscope, at least three degrees of freedom of the orientation of the lock mechanism from the ambient vibrations and motion.

Another Step 312 may include identifying, by the microcontroller, the most intense ambient vibrations and motion, as measured by the gyroscope and the accelerometer.

Yet another Step 314 comprises identifying, by the microcontroller, the degrees of freedom for the most intense vibration and motion.

A further Step 316 includes matching, by the pattern recognition algorithm, the degree of freedom for the most intense vibration and motion with numbers.

A final Step 318 comprises correlating, by the pattern recognition algorithm, the numbers with a stored passcode, whereby if the numbers match the stored passcode, the microcontroller transmits a signal to the fastener to lock or unlock the object. By correlating a sequence of the degrees of freedom 204a, 204b to the combination of numbers, the force, motion, rotation, etc., which is applied to the surface 104 of the lock mechanism 102 is quantified, and can be recorded and reapplied.

In one alternative embodiment, the method 300 includes a step of powering off, by a sleep module 132, at least one of the accelerometer, the gyroscope, and the microcontroller when substantially no ambient vibrations and motion are measured. After the initial reset or power-up, the sleep module enters a continuous short loop of low-power sleep mode to save energy for as long as there is no movement or vibration. Once any vibration is detected the microcontroller wakes up and starts processing. Once the passcode is completed meaning it positively compares to the stored correct passcode, the microcontroller sends a signal to momentary unlock, and then it returns to a Sleep mode.

In another alternative embodiment, the method may include a step of providing a learning module, the learning module operable to reprogram the sequence of ambient vibrations and motions on the surface of the lock mechanism. Continuing, a further step includes registering, with the microcontroller, subsequent degrees of freedom. After the degrees of freedom are found to match the subsequent passcode, another step may include transmitting, by the microcontroller, a subsequent signal to the fastener to lock or unlock the object based on the subsequent degrees of freedom. This is a way to generate new passcodes.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A pattern recognition locking system, the system comprising:
   a lock mechanism comprising at least one surface and a fastener, the surface receiving a sequence of ambient vibrations and motion, the fastener operable to lock and unlock an object;
   an accelerometer operatively connected to the surface of the lock mechanism, the accelerometer measuring at least three degrees of freedom of acceleration produced by the ambient vibrations and motion of the lock mechanism;
   a gyroscope operatively connected to the surface of the lock mechanism, the gyroscope measuring at least three degrees of freedom of the orientation produced from the ambient vibrations and motion of the lock mechanism, each degree of freedom correlating to a number; and
   a microcontroller operatively connected to the fastener of the lock mechanism, the microcontroller defined by a pattern recognition algorithm,
   the microcontroller identifying the most intense acceleration and orientation measured by the gyroscope and the accelerometer, the microcontroller further identifying the degrees of freedom for the most intense acceleration and orientation,
   the pattern recognition algorithm matching the degree of freedom for the most intense acceleration and orientation with numbers, the pattern recognition algorithm correlating the numbers with a stored passcode,
   whereby if the numbers match the stored passcode, the microcontroller transmits a signal to the fastener to lock or unlock the object.

2. The system of claim 1, further comprising a learning module.

3. The system of claim 2, wherein the learning module is operable to register, with the microcontroller, a subsequent three degrees of freedom of acceleration, and a subsequent three degrees of freedom of the orientation, whereby the microcontroller transmits a signal to the fastener to lock or unlock the object based on the subsequent degrees of freedom matching a new passcode.

4. The system of claim 3, further comprising a reset switch, the reset switch operable to enable registration of the subsequent three degrees of freedom of acceleration, and the subsequent three degrees of freedom of the orientation.

5. The system of claim 1, further comprising a sleep module.

6. The system of claim 5, wherein the sleep module is operable to power off at least one of: the accelerometer, the gyroscope, and the microcontroller when substantially no ambient vibrations and motion are measured.

7. The system of claim 1, further comprising a power source.

8. The system of claim 1, further comprising a lock and unlock relay defined by two activation states.

9. The system of claim 1, further comprising multiple interface wires comprising a common wire, a closed dry switch, and an open dry switch.

10. The system of claim 1, wherein the at least three degrees of freedom of acceleration are defined by AX, AY, and AZ.

11. The system of claim 10, wherein the at least three degrees of freedom of the orientation are defined by GX, GY, and GZ.

12. The system of claim 1, wherein the lock mechanism includes at least one of the following: a container, a jewelry box, a safe, a house door, a vehicle ignition, a padlock locking device, a bolt locking device, a magnetic locking device, and a household or commercial item operable to lock and unlock.

13. The system of claim 1, wherein the microcontroller stores the passcode.

14. A pattern recognition locking system, the system comprising:
   a lock mechanism comprising at least one surface and a fastener, the surface receiving a sequence of ambient vibrations and motion, the fastener operable to lock and unlock an object;
   an accelerometer operatively connected to the surface of the lock mechanism, the accelerometer measuring at least three degrees of freedom of acceleration generated by the ambient vibrations and motion of the lock mechanism, the degrees of freedom of acceleration being defined by AX, AY, and AZ;
   a gyroscope operatively connected to the surface of the lock mechanism, the gyroscope measuring at least three degrees of freedom of the orientation from the ambient vibrations and motion of the lock mechanism, each degree of freedom correlating to a number, the three degrees of freedom of the orientation being defined by GX, GY, and GZ, the degrees of freedom correlating to a combination of numbers;
   a microcontroller operatively connected to the fastener of the lock mechanism, the microcontroller defined by a pattern recognition algorithm,
   the microcontroller identifying the most intense acceleration and the orientation of the lock mechanism, as measured by the gyroscope and the accelerometer, the microcontroller further identifying the degrees of freedom for the most intense acceleration and the orientation, the pattern recognition algorithm matching the degree of freedom for the most intense acceleration and the orientation with numbers, the pattern recognition algorithm correlating the numbers with a stored passcode, whereby if the numbers match the stored passcode, the microcontroller transmits a signal to the fastener to lock or unlock the object, the microcontroller storing the passcode;

a sleep module operable to power off at least one of the accelerometer, the gyroscope, and the microcontroller when substantially no ambient vibrations and motion are measured;

a learning module operable to register, with the microcontroller, a subsequent three degrees of freedom of acceleration, and a subsequent three degrees of orientation, whereby the microcontroller transmits a signal to the fastener to lock or unlock the object based on the calculations of the subsequent degrees of freedom; and a light emitting diode indicator.

15. The system of claim 14, wherein the sleep module powers off the accelerometer, the gyroscope, and the microcontroller for the duration that substantially no ambient vibrations and motion are measured.

16. A pattern recognition locking method, the method comprising:

providing a lock mechanism comprising at least one surface and a fastener, the fastener operable to lock and unlock an object;

operatively connecting a microcontroller to the fastener of the lock mechanism, the microcontroller being defined by a pattern recognition algorithm;

applying a sequence of ambient vibrations and motions on the lock mechanism;

measuring, by an accelerometer, at least three degrees of freedom of acceleration of the lock mechanism generated by the ambient vibrations and motion;

measuring, by a gyroscope, at least three degrees of freedom of orientation of the lock mechanism generated by the ambient vibrations and motion;

identifying, by the microcontroller, the most intense ambient vibrations and motion, as measured by the gyroscope and the accelerometer;

identifying, by the microcontroller, the degrees of freedom for the most intense vibration and motion;

matching, by the pattern recognition algorithm, the degree of freedom for the most intense vibration and motion with numbers; and correlating, by the pattern recognition algorithm, the numbers with a stored passcode, whereby if the numbers match the stored passcode, the microcontroller transmits a signal to the fastener to lock or unlock the object.

17. The method of claim 16, further comprising a step of powering off, by a sleep module, at least one of the accelerometer, the gyroscope, and the microcontroller when substantially no ambient vibrations and motion are measured.

18. The method of claim 16, further comprising a step of reprogramming, by a learning module, the sequence of ambient vibrations and motions on the lock mechanism.

19. The method of claim 18, further comprising a step of registering, with the microcontroller, subsequent degrees of freedom.

20. The method of claim 19, further comprising a step of transmitting, by the microcontroller, a subsequent signal to the fastener to lock or unlock the object based on the subsequent degrees of freedom.

* * * * *